United States Patent
Sharma (10) Patent No.: US 9,992,132 B1
(45) Date of Patent: Jun. 5, 2018

(54) DYNAMIC RESOURCE EXPANSION OF MOBILE DEVICES

(71) Applicant: Amazon Technologies, Inc., Seattle, WA (US)

(72) Inventor: Anurag Sharma, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 14/868,359

(22) Filed: Sep. 28, 2015

Related U.S. Application Data (63) Continuation of application No. 13/595,748, filed on Aug. 27, 2012, now Pat. No. 9,148,473.

(51) Int. Cl.
| | |
|---|---|
| G06F 15/173 | (2006.01) |
| H04L 12/911 | (2013.01) |
| H04W 8/00 | (2009.01) |
| H04W 76/02 | (2009.01) |
| H04L 29/08 | (2006.01) |
| H04W 84/18 | (2009.01) |

(52) U.S. Cl.
CPC ............ *H04L 47/824* (2013.01); *H04L 47/78* (2013.01); *H04L 67/10* (2013.01); *H04W 8/005* (2013.01); *H04W 76/023* (2013.01); *H04W 76/14* (2018.02); *H04W 84/18* (2013.01)

(58) Field of Classification Search
CPC ........ G06F 9/5011; H04L 67/04; H04L 67/10; H04L 67/1021; H04L 47/824; H04L 47/78

USPC .................................................. 709/226, 229
See application file for complete search history.

(56) References Cited

U.S. PATENT DOCUMENTS

| | | | |
|---|---|---|---|
| 8,429,630 B2 | 4/2013 | Nickolov et al. | |
| 8,719,256 B2* | 5/2014 | Jones ................ | G06F 17/30637 707/718 |
| 8,874,477 B2 | 10/2014 | Hoffberg | |
| 2007/0255833 A1* | 11/2007 | Sharma .................. | H04L 67/32 709/226 |
| 2008/0137856 A1* | 6/2008 | Ja Beom ................. | G06F 21/33 380/255 |
| 2009/0276419 A1* | 11/2009 | Jones ................ | G06F 17/30637 |
| 2009/0276771 A1* | 11/2009 | Nickolov .............. | G06F 9/4856 717/177 |
| 2010/0223385 A1* | 9/2010 | Gulley .................. | G06F 9/5027 709/226 |
| 2011/0122878 A1* | 5/2011 | Li ........................ | H04L 45/026 370/400 |
| 2012/0069131 A1* | 3/2012 | Abelow ............... | G06Q 10/067 348/14.01 |

* cited by examiner

*Primary Examiner* — Kristie Shingles
(74) *Attorney, Agent, or Firm* — Athorus, PLLC (57) ABSTRACT

The resources available for performing computing tasks or functions on a mobile device may be dynamically expanded by wirelessly linking the mobile device with other devices over a network, such as a Bluetooth® network. Where the mobile device is charged with performing tasks or functions that would exceed its available resources, the mobile device may allocate the performance of those tasks or functions to other devices on the network. Conversely, where a local device on a network has available, unused computing resources, the local device may permit other devices on the network to utilize its computing resources for the performance of other tasks or functions.

18 Claims, 7 Drawing Sheets

DYNAMIC RESOURCE EXPANSION OF MOBILE DEVICES

CROSS-REFERENCE TO RELATED APPLICATIONS

This application is a continuation of U.S. patent application Ser. No. 13/595,748, filed Aug. 27, 2012, now U.S. Pat. No. 9,148,473, the contents of which are incorporated by reference herein in their entirety.

BACKGROUND

The advent of cellular telephone technology enabled users of personal, mobile telephones to communicate with one another across analog telephone networks. In the 1990s, as digital cellular telephone networks began to replace analog networks, and as battery storage life, wireless radio technology and computer processing technology continued to evolve, mobile telephones became increasingly versatile communications devices that were able to communicate with one another not only across cellular telephone networks but also over the Internet. Mobile devices now typically feature advanced processing equipment that can operate a wide variety of applications, or "apps," and may be utilized to perform wide-ranging functions.

By the 21st Century, many mobile devices began to include hardware for communicating with other devices not only indirectly through a network, such as a mobile telephone network or wireless fidelity ("WiFi") network, but also directly using inter-device wireless communications techniques, such as short-range wireless transmissions. Today, the most popular form of wireless inter-device communication technology is Bluetooth®, which permits users of such devices to create personalized networks known as Personal Area Networks (or PANs) or piconets for short-range inter-device communication, and does not require a central, networked server infrastructure or access to the Internet. By some estimates, up to two billion Bluetooth®-equipped devices will be shipped to users in the year 2013 alone, as mobile telephones, desktop computers, laptop computers, and tablet computers, as well as media players, accessories, and even automobiles are now regularly installed with Bluetooth®-enabled components for inter-device communication.

Although mobile devices are becoming increasingly powerful, the relative cost of top-of-the-line mobile devices such as smartphones remains substantially high. While baseline mobile devices may be obtained at comparatively lower prices than top-of-the-line models, the computing resources installed on baseline devices are often far less sophisticated, and far more limited, than those of top-of-the-line models. Moreover, as mobile device apps become more advanced, many apps may typically require greater computer processing capacity (e.g., processing power, random access memory or data base space) for short periods of time in order to perform one or more computing tasks or functions. Where a mobile device attempts to execute an app that requires computing resources which exceed its available intrinsic capacities, the mobile device must shut down or deactivate one or more other apps, or delay the execution of the app until additional intrinsic computing resources become available.

DETAILED DESCRIPTION

As is set forth in greater detail below, the present disclosure is directed to systems and methods for dynamically expanding the resources of mobile devices, such as by sharing available resources between and among multiple devices. Specifically, the present disclosure describes systems and methods that permit a mobile device to communicate with other devices according to a wireless standard or protocol, such as Bluetooth®, and to allocate the performance or execution of one or more functions or applications to the other devices via wireless means. The systems and methods of the present disclosure permit devices to communicate directly with one another or indirectly through a wireless hub, such as a router, regarding the performance of computing tasks without having to access the Internet, in order to ensure that the computing tasks assigned to the devices may be completed efficiently and effectively. According to the systems and methods of the present disclosure, a first mobile device may transfer the responsibility for performing all or a portion of one task, or of multiple tasks, to a second device for any reason. For example, the first mobile device may elect to allocate a task to the second device if the performance of the task requires computing resources that exceed those resources that are available on the first mobile device, or if the task could be performed more quickly or efficiently on the second device, or on one or more other devices in parallel.

Additionally, the systems and methods of the present disclosure further permit a mobile device to make its computing resources available to other devices within a specified range, so that such other devices may utilize the available resources on that mobile device to perform their own tasks, or tasks that have been allocated to them from other devices. Moreover, when an array of multiple mobile devices, each having a particular, intrinsic computing capacity, is interconnected via an independent, server-free network, such as a Bluetooth® piconet, a single device on the network may act as a master, and the other devices on the network may act as slaves, such that the master device coordinates the performance of the tasks on all of the devices on the network, and ensures that the tasks are collectively completed in the most efficient manner. The slave devices may then report information regarding the performance of their respectively allocated tasks to the master device, which may distribute such information to the devices from which the task originated.

Figure 1:
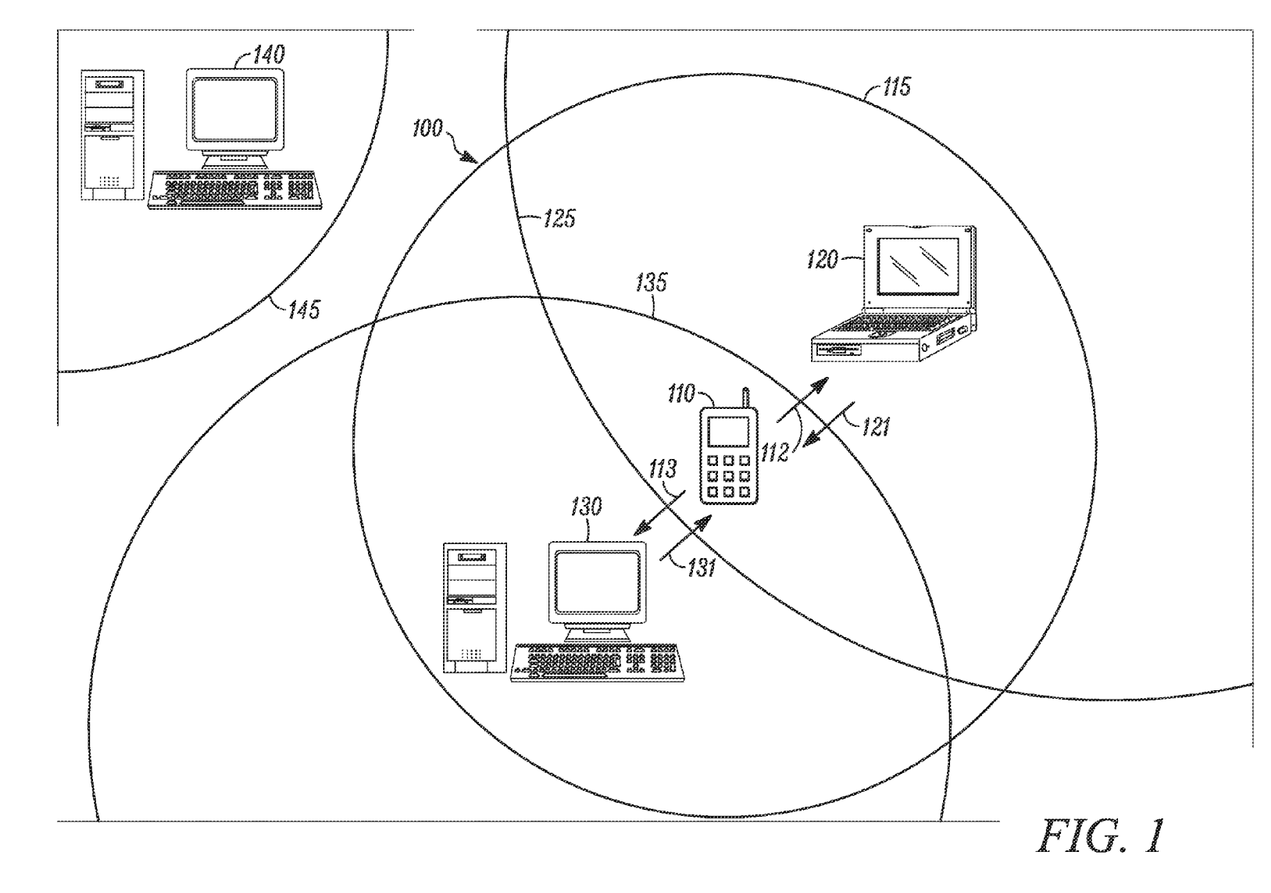
FIG. 1 is a system for dynamic resource expansion of mobile devices, in accordance with embodiments of the present disclosure.

The systems and methods disclosed herein may be utilized by a group of two or more devices that are adapted to communicate directly with one another, preferably according to a common communications standard or protocol such as Bluetooth®, and may alternatively include, but do not require, a central, networked server infrastructure for the purpose of sharing resources. Referring to FIG. 1, a system 100 including a mobile device 110, a laptop computer 120 and desktop computers 130, 140 is shown. Each of the devices 110, 120, 130, 140 is adapted to communicate with other devices according to a common communications standard or protocol, such as Bluetooth®, that are located within a specified communications range.

As is shown in FIG. 1, the mobile device 110 and the laptop computer 120 are within the respective communication ranges 115, 125 of one another, while the mobile device 110 and the desktop computer 130 are within the respective communication ranges 115, 135 of one another. The laptop computer 120 and the desktop computer 130 are not within the respective communication ranges 125, 135 of one another, and none of the devices is within the communication range 145 of the desktop computer 140. Therefore, the mobile device 110 is able to transmit messages directly to laptop computer 120 and desktop computer 130, respectively, and to receive messages directly from laptop computer 120 and desktop computer 130, respectively. The laptop computer 120 is unable to communicate directly with the desktop computer 130, and the desktop computer 140 is unable to communicate directly with any of the devices shown in FIG. 1.

According to the systems and methods of the present disclosure, the mobile device 110 is able to transfer or allocate the performance of one or more tasks, or portions thereof, to either the laptop computer 120 or the desktop computer 130, as is indicated by lines 112, 113, and to receive information (e.g., reports or data) relating to the performance of the tasks from either the laptop computer 120 or the desktop computer 130, as is indicated by lines 121, 131. Likewise, the laptop computer 120 and the desktop computer 130 are able to transfer a portion of all of one or more tasks to the mobile device 110, and to receive information (e.g., reports or data) relating to the performance of the tasks from the mobile device 110, but are unable to transfer portions of tasks, or receive tasks, directly from one another. However, the laptop computer 120 and the desktop computer 130 may transfer tasks to and from one another indirectly through the mobile device 110.

For example, as is shown in FIG. 1, the laptop computer 120 may transfer a computer-related task to the mobile device 110, which may then transfer the task to the desktop computer 130. When the desktop computer 130 has performed the task, the desktop computer 130 may transfer information (e.g., reports or data) relating to the performance of the task to the mobile device 110, which may then transfer the information to the laptop computer 120. Conversely, as is also shown in FIG. 1, neither the mobile device 110, the laptop computer 120 nor the desktop computer 130 is able to transfer or receive tasks from the desktop computer 140, unless and until the devices 110, 120, 130 move to within a communication range 145 of the desktop computer 140.

Therefore, a local device that is adapted to share resources with one or more other remote devices according to one or more of the systems and methods of the present disclosure may effectively enhance or expand its processing or computing power by sensing one or more remote devices within a vicinity and transferring the performance of one or more of the tasks to one or more remote devices within the vicinity. Reciprocally, such a local device may receive tasks from one or more remote devices within the vicinity, perform the tasks, and deliver information regarding the performance of the tasks to the remote device that assigned the tasks to the local device. Accordingly, a mobile device may effectively enhance or expand its processing or computing power by harnessing the processing or computing powers of nearby devices, particularly when the mobile device is tasked with performing one or more tasks that require computing resources in excess of those that are available to the mobile device, or one or more tasks that could be completed more effectively or efficiently with additional computing resources. The mobile device may also make its respective processing or computing power available to nearby devices.

Any type of computing device may be utilized in accordance with the systems and methods for dynamic resource expansion according to the present disclosure, including but not limited to a mobile telephone, such as a "smart" phone; a laptop, desktop or tablet computer; a personal digital assistant (PDA), as well as automobiles, appliances, media players, televisions or any other device that may be adapted to wirelessly communicate with other devices directly, or indirectly through one or more central server infrastructure components, such as a WiFi hub, without having to access an external network such as the Internet.

According to one embodiment of the present disclosure, an owner of a smart phone and a desktop computer is using the smart phone at his home, within a wireless inter-device communication range of the desktop computer. Both the smart phone and the desktop computer are configured for resource sharing via Bluetooth®, and the owner is using his smart phone to process several high-definition photographs and a video file that he recorded using the smart phone. In order to promptly complete the processing of the files, the owner instructs his smart phone to pair with his desktop computer via Bluetooth® and, once the devices are paired, allocates the processing of the video file to his desktop computer, while continuing to process the photographs using his smart phone. When the processing of the video file is complete, the desktop computer transmits a message to the smart phone indicating that the video file has been processed. By working in parallel to process the photographs and video file using the computing resources available on two separate machines from the smart phone, the owner is able to dynamically expand the resources that are available to his smart phone, and to complete the processing tasks more efficiently and effectively than if the processing tasks were performed on the smart phone alone.

According to another embodiment of the present disclosure, a central mass transit hub that is popular for commuters using mobile devices installs a Bluetooth®-enabled computer system featuring a surplus of microprocessors, accessible memory and hard drive storage space. The computer system is configured to act as a master device on an open Bluetooth® piconet, and to pair with any compatible Bluetooth®-enabled devices within the transit hub. Commuters who wish to access the surplus computing resources of the computer system may activate an app on their mobile devices to pair the mobile device with the computer system, which allocates the performance of the commuters' computing functions either to the computing system at the mass transit hub, or to the computing resources available on other commuters' devices, and may also allocate the performance of other computing functions to the commuters' mobile devices, as resources permit. Where a commuter's mobile device accesses the computing resources of the computing system or other commuters' devices, a fee may be charged to his or her credit card in a specified amount. Where a commuter's computing resources are accessed by the computing system or by other commuters' devices, a credit may be applied to his or her credit card in a specified amount. In such a manner, users of mobile devices who are at the mass transit hub during delays or layovers, or for any other reason, may pay to utilize the surplus computing resources available that are available through the computing system, and may be compensated for the use of their computing resources by other users' devices within the transit hub.

According to yet another embodiment of the present disclosure, a local device may join a network of other devices, and act as a master device to the other networked devices, or as a slave to one of the other devices in the network. If the local device acts as a master device, the local device may query each of the other devices in the network for an accounting of their available computing resources, as well as a summary of each of the computing tasks that have been assigned to the other devices. The local device may then allocate the performance of the computing tasks of the other devices in the network to one or more of the devices in the network, which may enable the tasks to be completed more effectively and efficiently in the aggregate than if the performance of the tasks was limited to the resources on the mobile device from which the tasks originated. If the local device acts as a slave to one of the other devices, the local device may report the tasks with which it has been tasked (if any) to the master device, as well as a summary of the computing resources that are available to it. The master device may then task one or all of the computing tasks of the networked devices to the local device, and one or all of the computing tasks of the local device to other networked devices. The networked devices will then complete all of the tasks or portions thereof that have been tasked thereto, and report the completion of the tasks to the master device, which will then circulate pertinent information regarding the completion of each of the tasks to the networked devices from which the tasks originated.

Accordingly, the systems and methods of the present disclosure enable mobile devices to functionally join with other devices within a predetermined communication range, and to collaborate on the performance of computing tasks that have been assigned to each of the devices by sharing the available computing resources of the respective devices, which may include processing power, memory, databases and/or access to other hardware or software. In such a manner, mobile devices may dynamically expand their available resources to include the resources of other, nearby devices, and to effectively complete computing tasks to which each has been assigned.

Today, many mobile devices are equipped to communicate with other devices indirectly through cellular or wireless fidelity ("WiFi") transceivers and networks and also directly through inter-device wireless communications systems, which typically utilize short-range, low-power and high-frequency radio transmissions. One of the most common forms of inter-device wireless communication is Bluetooth®, a high-speed, low-power, short-range wireless technology that was first developed in Denmark in the 1990s. Bluetooth® provides not only a universal bridge to existing data networks but also a peripheral interface and a means to form ad hoc networks that are independent of any central networked infrastructure. Bluetooth® technology includes both a radio-frequency standard and also a protocol followed by connected devices, under which the devices agree as to when and how information will be transmitted and as to how the successful reception of transmitted information will be confirmed by the devices. Bluetooth® technology permits a variety of devices to communicate with one another, even in a crowded radio frequency environment, as each Bluetooth®-enabled device has a unique 48-bit Bluetooth® Device Address (or BD_ADDR) defined according to Institute of Electrical and Electronics Engineers (IEEE) 802 standards.

When two or more Bluetooth®-enabled devices are connected to one another, or "paired," a wireless ad hoc network known as a "piconet," or Personal Access Network (or PAN), is created. The most basic piconet configuration consists of a single "master" device and one or more "slave" devices. A piconet may include up to eight devices, including one master device and seven "active" slave devices, based on the limitations of its three-bit address space, as well as up to 255 "parked" slave devices. A parked slave device may still participate in networked exchanges with the master device, as the designation of a slave device as "active," versus "parked," may change every two milliseconds (ms). Although Bluetooth® networks are limited to a single master and up to seven active slaves, as well as up to 255 parked slaves, the scope of coverage of Bluetooth® networks may be expanded by having a slave of one piconet act as a master in another piconet. The end result in such a scheme is called a "scatternet."

A Bluetooth®-enabled "source" device may search for other devices by entering an "inquiry" state, in which the source device transmits a device access code, or ID packet, on a set of 16 of 32 channels that may be used for inquiries, in alternating slots. During even slots, the source device transmits ID packets on two different channels, and during odd slots, the source device listens for other devices' responses on those two channels. This "hopping" sequence of slots repeats every ten milliseconds (ms) for each of the channels in the set before the transmission of ID packets switches to the other set of 16 channels. Meanwhile, Bluetooth®-enabled devices that are not connected to networks, or "destination" devices, and would like to be "discovered" by a source device, may enter an "inquiry scan" state, in which a destination device actively listens for inquiries on one of the 32 channels for at least ten milliseconds (ms) each, and responds with an ID packet when the destination device detects an ID packet transmitted by a source device. The source device then transmits a frequency hopping synchronization packet, or FHS packet, which contains the Bluetooth® device address of the source device as well as its clock native, to the destination device. When the source device and the destination device are authenticated, the devices are said to be paired as master and slave, respectively.

Bluetooth® transmissions are sent within an industrial, scientific and medical (ISM) radio frequency range of approximately 2.400 to approximately 2.500 gigahertz (GHz), with a center frequency of approximately 2.450 GHz, which is not presently licensed by most governments. Other devices that operate within this range include cordless phones, microwave ovens, surveillance equipment and other wireless devices. Bluetooth® signals are sent within the particular range of approximately 2.402 to approximately 2.480 GHz, and the maximum transmission rates on Bluetooth® networks is presently approximately 3 megabits per second (or 3 Mbps), while the maximum transmission range is presently approximately 10 to approximately 100 meters. Moreover, Bluetooth® devices typically transmit and receive signals at low powers, such as approximately one milliwatt (mW), or 0.001 watts (W).

Bluetooth® components operate according to the frequency-hopping spread spectrum (FHSS) method, which operates by switching carriers across multiple frequency channels and transmitting communications in small segments, and in respective time slots. According to the FHSS, Bluetooth® communications are transmitted approximately 1,600 times per second across 79 different subfrequencies at bandwidths of 0.001 GHz, or one megahertz (MHz) across the 2.402 to 2.480 GHz range. A piconet's FHSS scheme is established by the master and, because every piconet has a different master, every piconet also has a unique frequency-hopping sequence. Bluetooth® may be used to establish a wireless link any types of compatible devices, such as between a computer and a wireless keyboard, between a media player or mobile telephone and a wireless headset, or between a media player and an amplifier, such as those that are included in an automobile audio system.

In addition to Bluetooth®, other means for inter-device communication may also be utilized in accordance with the systems and methods of the present disclosure. Such compatible technologies include, but are not limited to, induction wireless, infrared wireless (such as technologies operating according to specifications and protocols provided by the Infrared Data Association, or IrDA) or ultra wideband formats. In some embodiments, one or more of the devices 110, 120, 130, 140 may be equipped with near field communication (NFC) transceivers that enabled the devices to directly exchange data. In still other embodiments, the devices 110, 120, 130, 140 may support acoustic-based data transfer. For example, the mobile device 110 may include software components and a speaker that enable the mobile device 110 to broadcast data to a second mobile device (not shown) as sound waves, while the second mobile device may include software components and microphone that enable the second mobile device to receive the data embedded in the sound waves. Thus, one or more of radio signal-based data transfer (e.g., Bluetooth®), light-based data transfer (e.g., infrared data transfer), or an acoustic-based data transfer (e.g., sound wave-embedded data) may be used for inter-device communication. The protocols and components for enabling computing devices to perform the systems and methods of the present disclosure using such means for inter-device communication are well known to those skilled in the art of computer communications and thus, need not be described in more detail herein.

Moreover, the systems and methods of the present disclosure may be utilized to allocate the performance of any type of computing function from one device to another through wireless, inter-device means. Some exemplary computing functions that may be allocated in accordance with the systems and methods of the present disclosure may include performing media processing applications (e.g., scaling, clipping, flashing, sharpening or filtering of images, audio or video), executing complex computing functions (e.g., applied mathematics, linear or multivariable algebra, multidimensional arrays), participating as a node in one or more artificial neural networks, or any other type of computing function.

The systems and methods of the present disclosure may feature any number and any type of computing devices having various available computer resources that may be programmed or otherwise adapted to communicate with one another over one or more wireless inter-device means. For example, the systems and methods of the present disclosure may feature mobile devices, such as the mobile device 110 shown in FIG. 1, laptop or desktop computers, such as the laptop computer 120 or the desktop computers 130, 140 shown in FIG. 1, or any other type of computer-related or computer-affiliated machine that is adapted for wireless inter-device communication with other such machines, including but not limited to tablet computers, personal digital assistants (PDAs), mobile digital assistants (MDAs), media players, audio players, digital cameras, global positioning system (GPS) devices, automobiles, pagers, appliances, set-top boxes, web pads, electronic book readers, televisions, video game consoles, appliances, automobiles and the like.

The devices, computers and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein. Also, those of skill in the pertinent art will recognize that the devices, computers and the like described herein may be accessed using a keyboard, keypad, mouse, stylus, touch screen, or other device (not shown) or method for interacting with their respective devices, computers and the like, or to "select" an item, link, node, hub or any other aspect of the present disclosure.

Except where otherwise explicitly or implicitly indicated herein, process steps described as being performed by a "mobile device," a "local device" or a "remote device" may be automated steps performed by their respective computer systems, or implemented within software modules (or computer programs) executed by one or more general purpose devices. Moreover, process steps described as being performed by a "mobile device," a "local device" or a "remote device" are typically performed by a human operator via such devices, such as the mobile device 110, the laptop computer 120 or the desktop computers 130, 140 shown in FIG. 1, but could, alternatively, be performed by one or more automated agents.

Data and/or computer executable instructions, programs, firmware, software and the like (also referred to herein as "computer executable" components) described herein may be stored on a computer-readable medium that is within or accessible by the respective devices, such as the mobile device 110, the laptop computer 120 or the desktop computers 130, 140 shown in FIG. 1, and may have sequences of instructions which, when executed by a processor (such as a central processing unit, or CPU), cause the processor to perform all or a portion of the functions and/or methods described herein. Such computer executable instructions, programs, software and the like may be loaded into the memory of the devices using a drive mechanism associated with the computer-readable medium, such as a floppy drive, CD-ROM drive, DVD-ROM drive, network interface, or the like, or via external connections. For example, the systems and methods of the present disclosure may be incorporated into existing software for operating peripherals (e.g., drivers) or in free-standing applications, or may be included as plug-ins that provide additional functionality to existing software applications (e.g., browsers, word processing applications, and the like), or hardware components.

Embodiments may also be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read only memories (EPROMs), electrically erasable programmable read only memories (EEPROMs), flash memory, magnetic or optical cards, solid-state memory devices, or other types of media/machine-readable medium that may be suitable for storing electronic instructions. Further, embodiments may also be provided as a computer program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, including signals that may be downloaded through the Internet or other networks.

Figure 2:
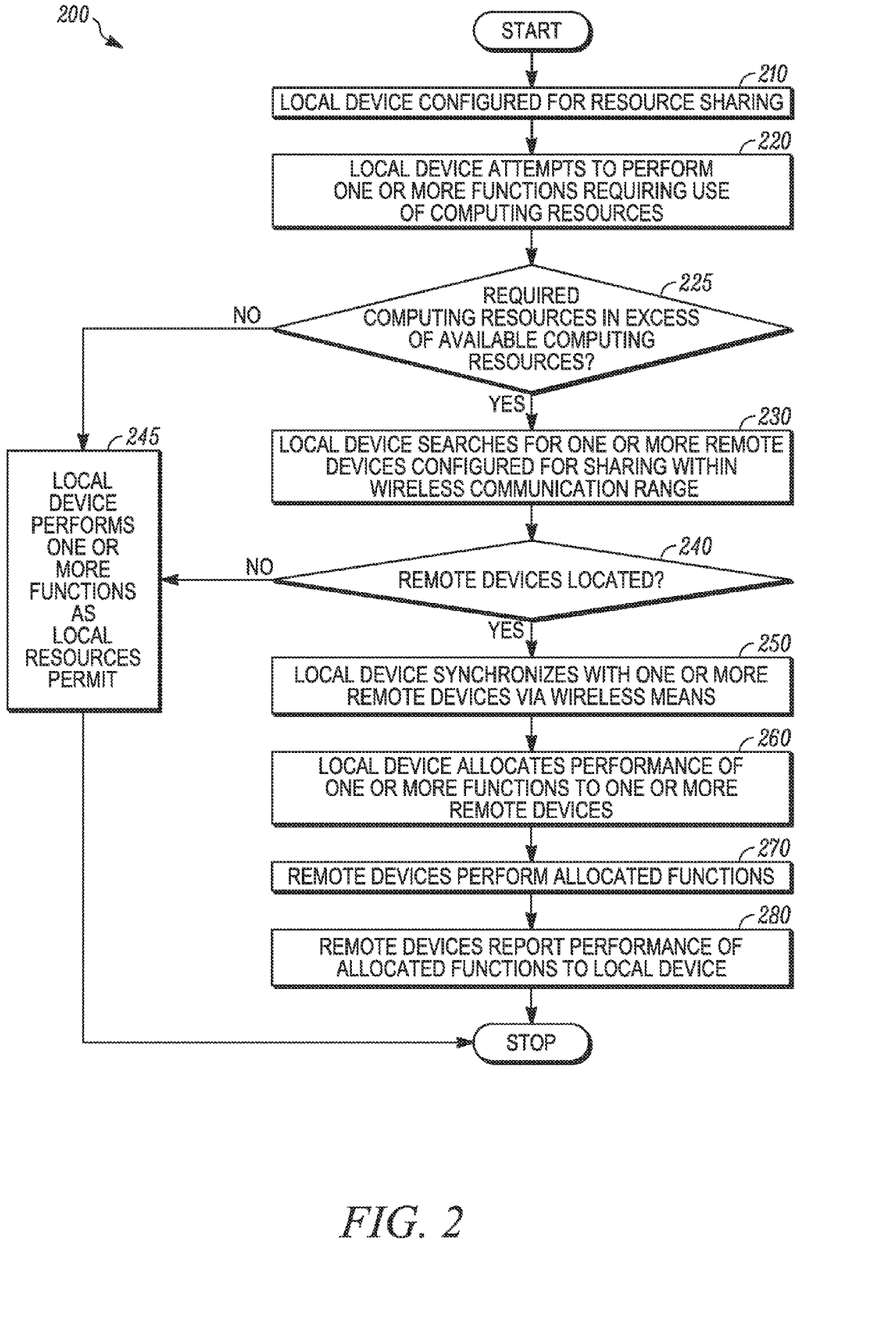
FIG. 2 is a flow chart of a method for dynamic resource expansion of mobile devices, in accordance with embodiments of the present disclosure.

Referring to FIG. 2, a flow chart 200 representing one embodiment of a method for dynamically expanding the available resources of a mobile device according to the present disclosure is shown. At step 210, the local device is configured for resource sharing. For example, the device may initiate one or more programs or applications that transmit and/or receive Bluetooth® wireless signals to or from other devices, and may offer to act as a master to or slave for one or more other devices. At step 220, the local device attempts to perform one or more computing functions that require the use of computing resources (e.g., processing power, memory, data storage space or a particular type or version of software application). For example, a user of the mobile device may attempt to process an image, audio or video file, to perform a series of complex calculations, or to execute any other type of computing function that requires the short-term or long-term use of computing resources, such as a microprocessor or database.

At step 225, the local device may determine whether the computing resources that it requires in order to perform the computing functions with which it has been tasked exceed the computing resources that are currently available. If the necessary computing resources for performing the computing functions are within the capacity of the computing resources that are currently available to the local device, then the process advances to step 245, where the local device performs the computing functions with which it has been tasked, as its resources permit.

If the necessary computing resources exceed the computing resources that are currently available to the local device, then the process advances to step 230, where the local device searches for one or more remote devices that are configured for resource sharing within a wireless communication range. At step 240, if no such remote devices are located, then the process advances to step 245, where the local device performs the computing functions with which it has been tasked, as its resources permit. If one or more remote devices that are configured for resource sharing are located, however, then the process advances to step 250, where the local device synchronizes with one or more of the remote devices, via wireless means. For example, where the local device and one or more remote devices are Bluetooth®-enabled, the local device may act as a master device, and establish a piconet with the one or more remote devices as slave devices.

At step 260, the local device may allocate the performance of one or more of the computing functions to one or more of the remote devices with which it has been synchronized. For example, the local device may allocate computing functions to a remote device based on the processing power and/or database that may be available on that remote device, the strength of the wireless link between the local device and that remote device, any software applications that may be available on that remote device, or any other factor. Additionally, the local device may partition a particular task into segments and allocate those segments to one or more specific remote devices. At step 270, the remote devices may perform the functions or portions thereof that have been allocated thereto, and at step 280, the remote devices may report the performance of the one or more allocated functions to the local device. For example, a remote device processes a photograph or other media file on behalf of a local device, and may either transmit the processed photograph or media file directly to the local device, or provide the local device with a location (e.g., a hyperlink or address to a folder on a particular server) where the processed photograph or media file may be found.

Accordingly, through the use of the systems and methods of the present disclosure, a local device that is tasked with performing a series of computing functions and is configured for resource sharing may identify one or more remote devices that are also configured for resource sharing within its vicinity, and determine the extent of the computing resources available to each of the remote devices. Upon evaluating the extent of the computing resources that are available on each of the remote devices that are within its vicinity, a local device may elect to transfer some or all of the computing functions with which it has been tasked to one or more of the remote devices, or to retain all of the computing functions for itself.

Figure 3A:
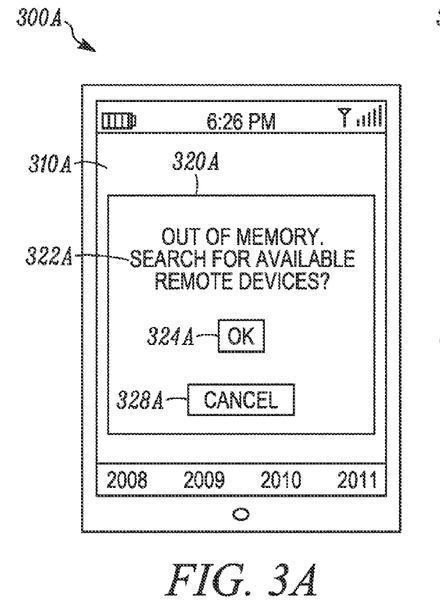
FIGS. 3A, 3B, 3C and 3D are user interfaces of a system for dynamic resource expansion of mobile devices, in accordance with embodiments of the present disclosure.
Figure 3B:
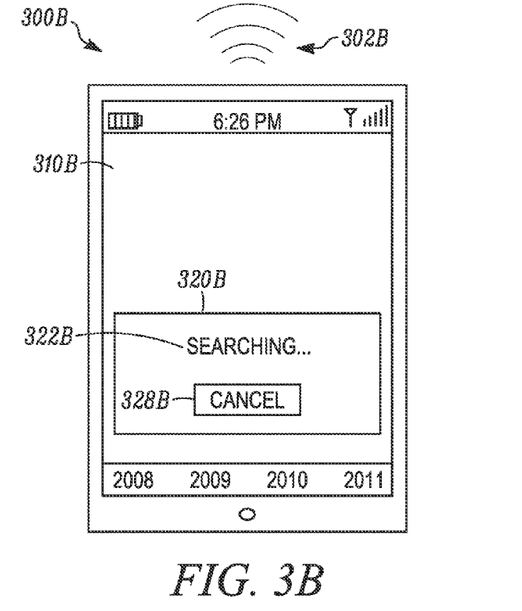

Users may interact with devices that are configured for resource sharing through one or more user interfaces which may provide selectable features for resource sharing, display pertinent status information (e.g., information regarding the status of a task or of available computing resources on one or more devices), or display any other relevant information to a user. Referring to FIGS. 3A through 3D, a series of user interfaces 310A, 310B, 310C, 310D on a local device that is operating according to one or more of the systems and methods of the present invention is shown. Referring to FIG. 3A, when a user of a local device 300A attempts to execute a series of computing functions that would exceed the available computing resources on the local device 300A, a box 320 including a message 322A is displayed to the user as an overlay on the user interface 310A, indicating that the local device 300A is out of memory. The box 320A queries the user to confirm whether he or she wishes to search for available remote devices by selecting button 324A ("OK") or button 328A ("Cancel"). Referring to FIG. 3B, the mobile device 300B is shown after the selection of button 324A in FIG. 3A. The mobile device 300B is shown in FIG. 3B as transmitting wireless communications 302B to other devices in the vicinity, and a box 320B containing a message 322B indicating that a search for remote devices is in progress is displayed as an overlay on the user interface 310B.

Figure 3C:
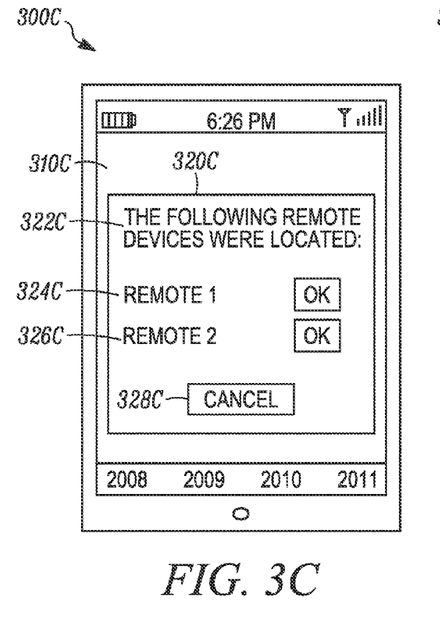
Figure 3D:
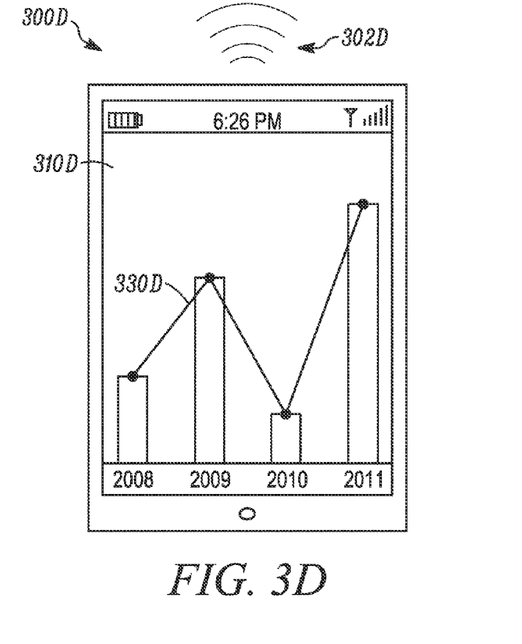

Referring to FIG. 3C, the mobile device 300C is shown after one or more available remote devices has been located. Box 320C is displayed as an overlay on the user interface 310C, and includes buttons 324C, 326C that may be selected in order to choose one of the available remote devices that has been located, as well as button 328C, which may be selected to cancel the request. Referring to FIG. 3D, the mobile device 300D is shown after having performed the function 330D, the results of which are shown on user interface 310D, and as transmitting wireless communications 302D to the selected remote device.

Figure 4:
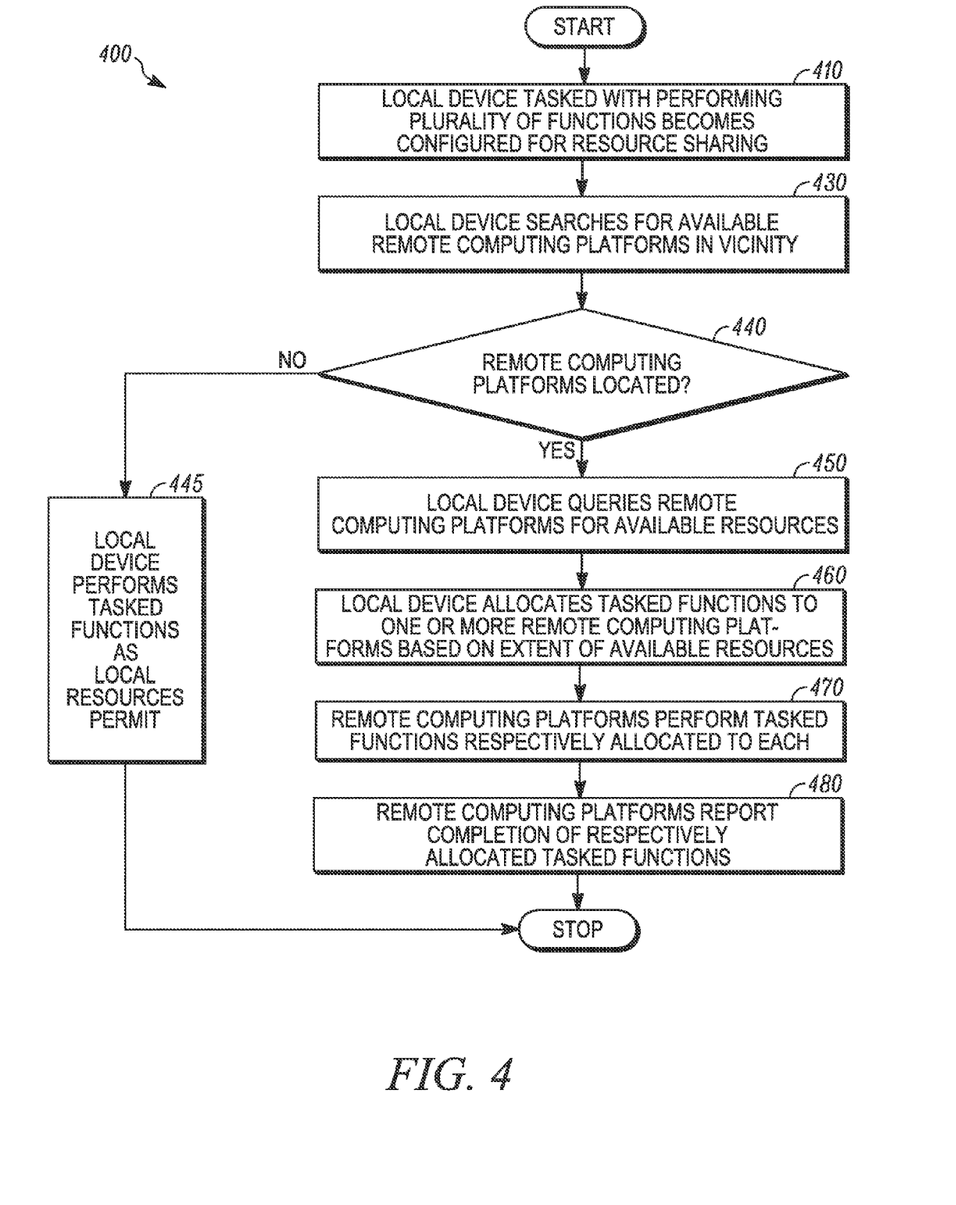
FIG. 4 is a flow chart of a method for dynamically expanding the resources available to mobile devices, in accordance with embodiments of the present disclosure.

According to the systems and methods of the present disclosure, a local device may allocate some or all of the computing functions with which it has been tasked to other nearby computing platforms based on the extent of the computing resources that are available on each of the respective computing platforms. Referring to FIG. 4, a flow chart 400 representing one embodiment of a method for dynamically expanding the available resources of a mobile device according to the present disclosure is shown. Except where otherwise noted, reference numerals preceded by the number "4" in FIG. 4 indicate steps that are similar to steps having reference numerals preceded by the number "2" shown in FIG. 2.

At step 410, a local device that has been tasked with performing a plurality of computing functions is configured for resource sharing. The configuration of the local device may take place on any basis and for any reason, such as manually by a user (e.g., by a change in settings or a selection of a feature on a user interface), or automatically if the computing functions that have been tasked to the local device are determined to require more computing resources than are presently available to the local device. At step 430, the local device searches for available remote computing platforms within its vicinity. At step 440, if no remote computing platforms are located, then the process advances to step 445, where the local device performs tasked functions as local resources permit.

If any remote computing platforms that are configured for resource sharing are located by the local device, however, then the process advances to step 450, where the local device queries the remote computing platforms in order to determine the extent of their respective available resources. For example, a query may include a blanket request that is sent to each of the respective devices (i.e., a request for the extent of a device's processing power, random access memory, available database storage area or software modules), or a narrow request for a particular type of computing resource for which the local device has a specific need (i.e., where a local device requires additional database storage, the device may request that each remote device report the extent of its available hard drive space, or where a local device requires a particular software application, the device may request that each remote device report the current version of the software application presently stored thereon). Additionally, the query may take the form of a direct, asynchronous request, or a synchronous operation in which the local device automatically determines the status of the available resources on one or more remote devices with which it has been synchronized.

At step 460, the local device allocates tasked functions to one or more of the remote computing platforms that were located at step 440, based on the extent of the platforms' available resources. For example, where the local device is tasked with performing a computing function that requires a substantial amount of random access memory, the local device may allocate the performance of that computing function to the remote computing platform having the greatest amount of random access memory available to it. Alternatively, where the time at which a computing function must be completed is of the essence, the local device may allocate the performance of that computing function to the remote computing platform having a central processing unit with the fastest clock rate.

At step 470, the remote computing platforms perform the computing functions that have been respectively allocated to each. At step 480, the remote computing platforms report the completion of the respectively allocated computing functions to the local device, and the process ends.

Accordingly, a local device that is configured for resource sharing may search for and identify a number of other, remote devices that are also configured for resource sharing, and may allocate a computing function to a remote device based on the demand for computing resources that may be required in order to complete a specific computing function, the available supply of computing resources at the remote device, or any other factor. In such a manner, a local device may dynamically expand its available resources through wireless inter-device communications means in order to complete the computing function more quickly, effectively and/or efficiently than if the local device was not configured for resource sharing, or if the local device was required to perform the computing function using only its available computing resources. Furthermore, the systems and methods of the present disclosure may further utilize a compensation system for the use of computing resources, pursuant to which devices (or owners thereof or entities associated therewith) are charged a fee for the use of computing resources on other devices and/or devices (or owners thereof or entities associated therewith) are compensated for the use of their intrinsic computing resources by other devices.

Figure 5A:
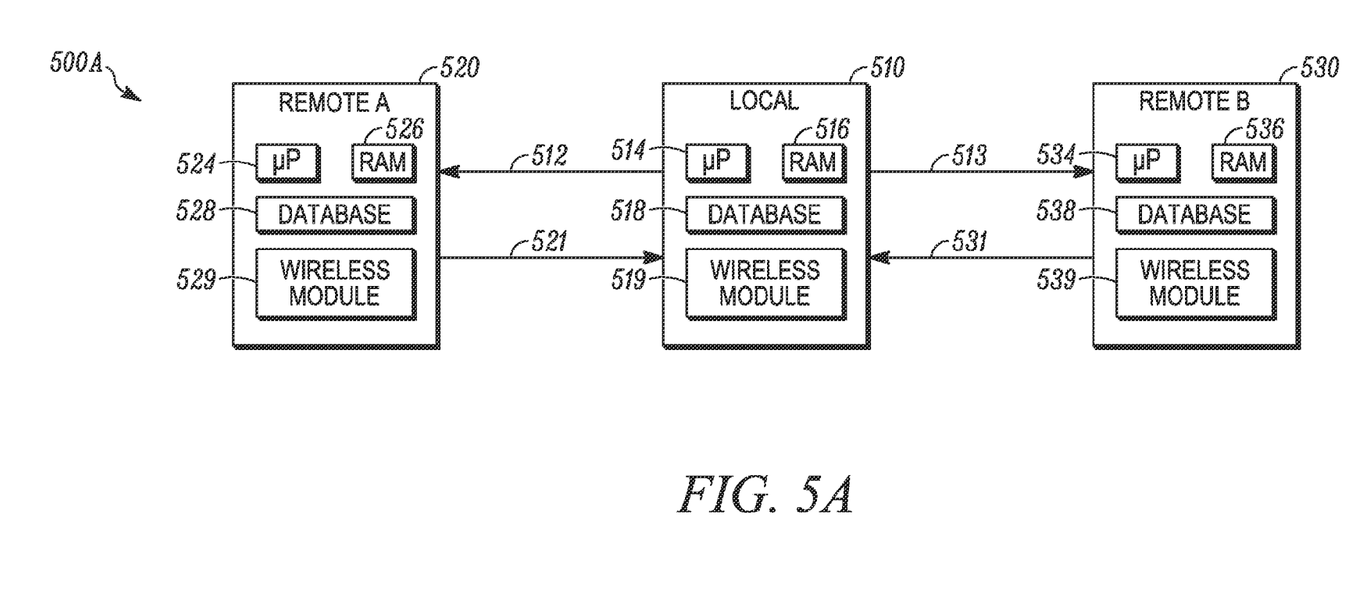
FIGS. 5A and 5B are flow diagrams of communications between components of a system for dynamically expanding the resources available to mobile devices, in accordance with embodiments of the present disclosure.

The allocation of a computing function from a local device to one or more remote devices, or vice versa, may be determined on any basis, such as the available computing resources on the remote devices, the particular resources required by the computing function, or any other factor. Referring to FIG. 5A, a flow diagram 500A is shown. As is shown in FIG. 5A, the flow diagram 500A depicts the transfer of data between a local device 510 and remote devices 520, 530. The local device 510 includes a microprocessor 514, a set of random access memory (or RAM) 516, a database 518 and a wireless module 519 for communicating with other devices. Likewise, the remote devices 520, 530 include microprocessors 524, 534, sets of random access memory 526, 536, databases 528, 538 and wireless modules 529, 539.

The flow diagram 500 of FIG. 5A shows the transfer of information from the local device 510 to the remote devices 520, 530, as indicated by lines 512, 513. The flow diagram 500A also shows the transfer of information from the respective remote devices 520, 530 to the local device 510, as indicated by lines 521, 531.

Figure 5B:
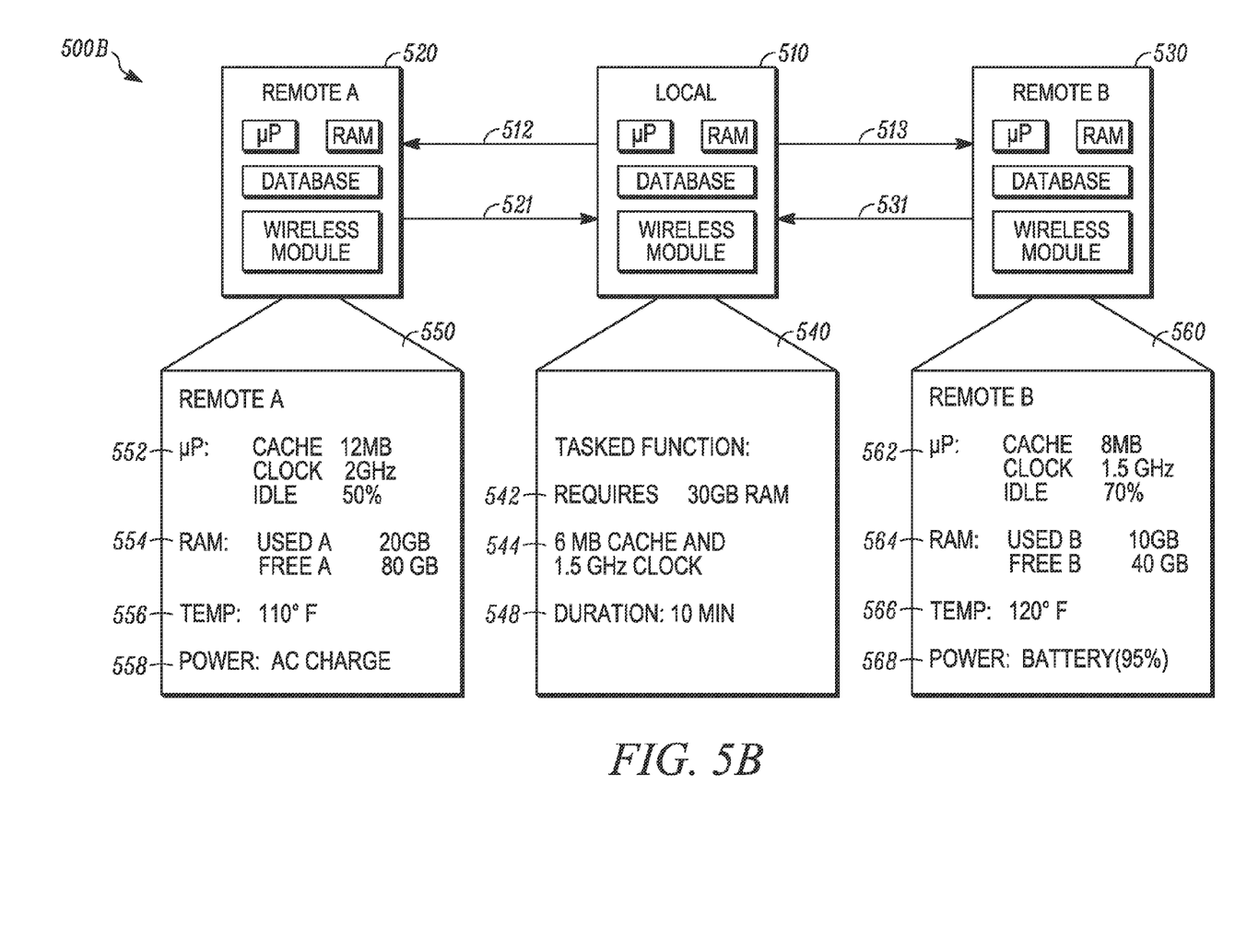

Referring to FIG. 5B, the flow diagram 500A of FIG. 5A is shown, along with a summary of the computing resources 540 that are required to perform a computing function that has been tasked to the local device 510 and summaries of the computing resources 550, 560 that are presently available on remote devices 520, 530, respectively. As is shown in FIG. 5B, the computing function requires a certain amount of memory 542 and processing power 544, and for a specified duration 548. As is also shown in FIG. 5B, the computing resources 550 that are available on the remote device 520 are shown, including the status 552 of the microprocessor on the remote device 520, the status 554 of the memory on the remote device 520, the operating temperature 556 of the remote device 520 and the status 558 of the power supply of the remote device 520. Meanwhile, the computing resources 560 that are available on the remote device 530 are shown, including the status 562 of the microprocessor on the remote device 530, the status 564 of the memory on the remote device 530, the operating temperature 566 of the remote device 530 and the status 568 of the power supply to the remote device 530.

The systems and methods of the present disclosure that may be operating on the local device 510 may allocate the performance of the tasked function to one or more of the remote devices 520, 530 based on the available resources there. For example, as is shown in FIG. 5B, the processor 524 of the remote device 520 has a larger available cache and a higher clock rate, as well as a larger percentage of its microprocessor that is idle, than the processor 534 of the remote device 520. Similarly, as is also shown in FIG. 5B, a greater amount of memory 526 is available for use by allocated functions on the remote device 520 than on the remote device 530. Furthermore, the remote device 520 is operating at a lower temperature 556 than the remote device 530, and the remote device 520 is receiving power 558 through wired means, while the remote device 530 is operating off its battery 568, which is at a ninety-five percent charged status.

The local device 510, or operators thereof, may consider any of the information regarding the computing resources 550 that may be available on the remote device 520, and the computing resources 560 that may be available on the remote device 530, shown in FIG. 5B, or any other data, in determining whether or where to allocate the performance of the tasked function 540. For example, although the microprocessor 524 of the remote device 520 operates at a higher clock rate 552 than the microprocessor 534 of the remote device 530, higher clock rates are known to require greater increased power consumption, and the extent of available power may be a factor in determining whether the tasked function should be allocated to the remote device 520 or the remote device 530. Other factors not shown in FIG. 5B may also be considered by the local device 510, or operators thereof, in determining the remote device, if any, to which the performance of the tasked function should be allocated. For example, the rate at which information 512, 513, 521, 531 may be transferred to and from the local device 510 by the remote devices 520, 530, or the reliability of the power supplies 558, 568 of the remote devices 520, 530, may also be considered.

Figure 6:
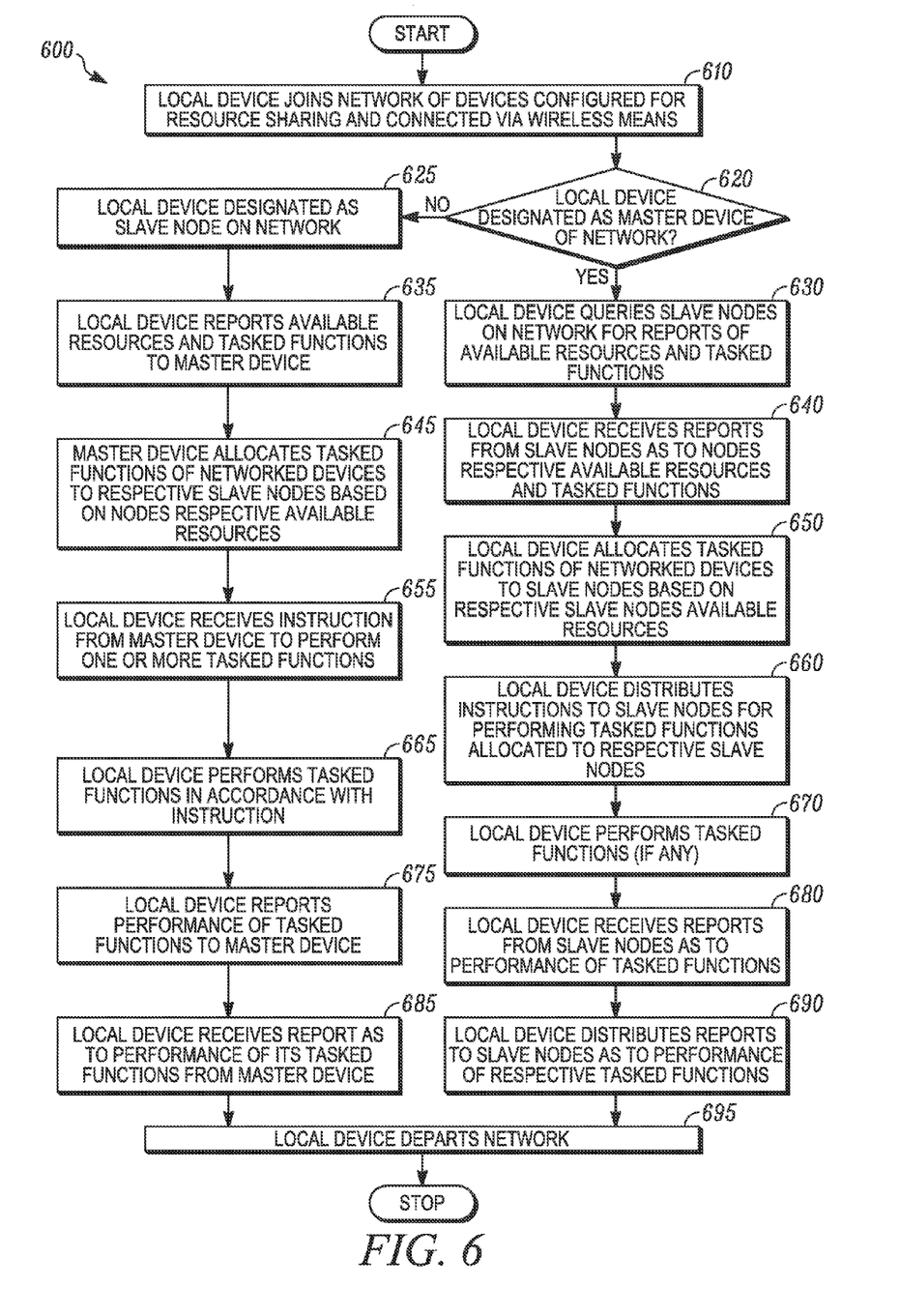
FIG. 6 is a flow chart of a method for dynamically expanding the resources available to one or more mobile devices, in accordance with embodiments of the present disclosure.

When a device joins a resource sharing network, the device may report the status of its available resources, and the tasks that have been allocated to it, to a supervisory device on the network, and perform one or more tasks at the discretion of the supervisory device (i.e., by acting as a slave device on a Bluetooth® piconet). Alternatively, the device may assume control over the performance of tasks by the devices of the network (i.e., by acting as a master device on a Bluetooth® piconet) and allocate those tasks to networked devices based on their respective available computing resources and the types of tasks that must be performed. Referring to FIG. 6, a flow chart 600 representing one embodiment of a method for dynamically expansion of resources of a mobile device according to the present disclosure is shown. At step 610, a local device may join a network of devices that are configured for resource sharing and connected via wireless means. At step 620, it is determined whether the local device has been designated as the master device for the network. If the local device is designated as the master device for the network, then the process advances to step 630. If the local device is designated as a slave node on the network, then the process advances to step 625.

If the local device is designated as the master device for the network, then at step 630, the local device queries the slave nodes on the network for reports as to the nodes' respective available resources and tasked functions. For example, the local device may request that each of the nodes report their respective processing power, memory, database storage space, software applications (and versions thereof) to the local device, as well as a list of any computing tasks that have been assigned to each. At step 640, the local device receives reports from the slave nodes as to the nodes' respective available resources and tasked functions.

At step 650, the local device allocates the tasked functions of the networked devices to the slave nodes based on the resources that are available at each of the respective slave nodes. At step 660, the local device distributes instructions to slave nodes for performing tasked functions that have been allocated to each of the respective slave nodes. For example, upon receiving reports of the available resources and tasked functions at each of the slave nodes, the local device may assign or otherwise allocate the respective functions to be performed to other devices on the network on any basis, such as the resources that are respectively available at each node (e.g., allocating a memory-intensive application to be performed on a remote device having sufficient available random access memory (RAM), or allocating a function requiring a particular version of software to be performed on a remote device having the particular version of software installed thereon).

At step 670, the local device performs the tasked functions, if any, that it has allocated to itself. At step 680, the local device receives reports from slave nodes as to the performance of each of the tasked functions that have been allocated to each of the slave nodes. Finally, at step 690, the local device distributes reports as to the performance of each of the tasked functions to each of the slave nodes from which the tasked functions were originally received, and at step 695, the local device departs the network.

If the local device is designated as a slave node on the network, then at step 635, the local device reports its available resources and the functions that have been tasked to it to the master device. At step 645, the master device allocates tasked functions to the slave nodes on the network based on their respective available resources, and at step 655, the local device receives an instruction to perform one or more of the tasked functions from the master device. For example, the local device may receive instructions to perform computing functions that were originally tasked to other slave nodes, or to itself, and may also receive instructions not to perform any computing functions at all, depending on the available computing resources of the local device and the other slave nodes. At step 665, the local device performs the tasked functions that have been allocated to it by the master device, and at step 675, the local device reports the performance of those functions to the master device. At step 685, the local device receives a report as to its own tasked functions that were performed by other slave nodes from the master device, and at step 695, the local device departs the network.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. While the present disclosure describes exemplary embodiments that utilize Bluetooth® technology in communicating with mobile devices such as smart phones or tablet computers, the systems and methods of the present disclosure are not so limited.

First, the systems and methods of the present disclosure may utilize any of a number of wireless communications formats or protocols, and are not limited to the use of Bluetooth® technology. For example, devices may communicate with one another using induction wireless systems, infrared wireless systems, ultra wideband systems, or any other means for wireless inter-device communication, in accordance with the present disclosure. Second, such systems and methods are not limited to mobile devices such as smartphones or tablet computers. For example, an array of desktop devices that are configured for resource sharing and installed in an office or other fixed setting, and are functionally linked to one another via wireless inter-device means, such as in an office, may allocate the performance of tasks to any of the other desktop devices, based on the availability of computing resources on each desktop device. In such a manner, the costs of providing such an array of devices may be reduced, in that the devices need not each contain sufficient computing resources to perform all of the functions with which they may be tasked, and may collectively share resources where and when one or more such devices requires them.

Moreover, a market for the sharing of computing resources may be established where a network of wirelessly linked devices is established. In such a manner, networked devices (or entities associated therewith) may be obligated to pay a fee when they require the use of additional resources on other devices, and, likewise, the networked devices (or entities associated therewith) may be compensated when other devices require the use of their respective computing resources.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIGS. 2, 4 and 6, the order in which the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A computer-implemented method for performing computing tasks comprising:
   identifying at least one computing task assigned to a first device configured for sharing computing resources, wherein the first device is connected to a wireless inter-device network, wherein at least a portion of the wireless inter-device network operates in a frequency band of approximately 2.400 GHz to approximately 2.500 GHz;
   automatically determining a level of computing resources available to the first device;
   automatically determining a required level of computing resources for performing the at least one computing task using at least one computer processor, wherein the required level of computing resources for performing the at least one computing task comprises at least one of a predetermined processor cache, a predetermined processor clock speed, a predetermined amount of database storage capacity, a predetermined wireless transmission rate or a predetermined software application;
   determining that the required level of computing resources for performing the at least one computing task meets or exceeds the level of computing resources available to the first device;
   identifying a second device configured for sharing computing resources via the wireless inter-device network using the at least one computer processor;
   pairing the first device with at least the second device;
   automatically determining a level of computing resources available to the second device using the at least one computer processor;
   determining that the level of computing resources available to the second device meets or exceeds the required level of computing resources for performing the at least one computing task;
   transmitting, via the wireless inter-device network, an instruction to perform the at least one computing task from the first device to the second device; and
   receiving, via the wireless inter-device network, a confirmation that the second device has performed the at least one computing task.

2. The computer-implemented method of claim 1, wherein the wireless inter-device network comprises at least one of:
   an Infrared wireless network;
   a near field communication network; or
   an acoustic-based data transfer network.

3. The computer-implemented method of claim 1, wherein the at least one computing task comprises at least one of:
   performance of a media processing application;
   execution of an applied mathematics function; or
   participation as a node in at least one artificial neural network.

4. A method for dynamically expanding computing resources comprising:
   identifying at least one computing task to be performed using a first computing device having a first set of computing resources using at least one computer processor;
   automatically determining a minimum set of computing resources required to perform the at least one computing task, wherein the minimum set of computing resources comprises at least one of a minimum processor cache, a minimum processor clock speed, a minimum amount of random access memory, a minimum amount of available database storage or a minimum transmission rate on the wireless server-free network;
   automatically determining that the first set of computing resources does not equal or exceed the minimum set of computing resources required to perform the at least one computing task;

in response to automatically determining that the first set of computing resources does not equal or exceed the minimum set of computing resources required to perform the at least one computing task,
  pairing the first computing device with at least a second computing device via a wireless server-free network, wherein at least a portion of the wireless server-free network operates in a frequency band of approximately 2.400 GHz to approximately 2.500 GHz;
  automatically determining a second set of computing resources of the second computing device;
  automatically determining that the second set of computing resources equals or exceeds the minimum set of computing resources required to perform the at least one computing task; and
  automatically allocating the at least one computing task to the second computing device over the wireless server-free network.

5. The method of claim 4, further comprising:
in response to automatically determining that the first set of computing resources does not equal or exceed the minimum set of computing resources,
  configuring the first computing device for resource sharing.

6. The method of claim 4, wherein pairing the first computing device with at least the second computing device via the wireless server-free network comprises:
  pairing the first computing device with each of a plurality of computing devices via the wireless server-free network, wherein the plurality of computing devices includes the second computing device.

7. The method of claim 4, wherein automatically determining the second set of computing resources of the second computing device comprises:
  transmitting at least a first device access code on at least one channel of the wireless server-free network;
  receiving, from at least the second computing device, a second device access code on the at least one channel of the wireless server-free network.

8. The method of claim 4, further comprising:
  automatically determining that the at least one computing task was performed by the second computing device;
  determining a fee for the allocation of the at least one computing task to the second computing device; and
  automatically assessing the fee to at least one entity associated with the first computing device.

9. The method of claim 4, wherein the least one computing task comprises a first computing task and a second computing task;
  wherein automatically determining the minimum set of computing resources required to perform the at least one computing task comprises:
    automatically determining a minimum set of computing resources required to perform the first computing task,
  wherein pairing the first computing device with at least the second computing device further comprises:
    pairing the first computing device with at least a third computing device via the wireless server-free network,
  wherein automatically allocating the at least one computing task to the second computing device further comprises:
    automatically allocating the first computing task to the second computing device over the wireless server-free network; and
  wherein the method further comprises:
    automatically determining a minimum set of computing resources required to perform the second computing task;
    automatically identifying a third set of computing resources of the third computing device;
    automatically determining that the third set of computing resources equals or exceeds the minimum set of computing resources; and
    automatically allocating the second computing task to the third computing device over the wireless server-free network.

10. The method of claim 4,
wherein automatically allocating the at least one computing task to the second computing device over the wireless server-free network comprises:
  automatically transmitting an instruction to perform the at least one computing task to the second computing device over the wireless server-free network.

11. The method of claim 4, wherein the wireless server-free network comprises at least one of:
  an Infrared wireless network;
  a near field communication network; or
  an acoustic-based data transfer network.

12. The method of claim 4, wherein the first computing device is at least a portion of:
  an automobile;
  a desktop computer;
  a laptop computer;
  a media player;
  a mobile telephone;
  a smartphone; or
  a tablet computer.

13. The method of claim 4, wherein the at least one computing task comprises at least one of:
  performance of a media processing application;
  execution of an applied mathematics function; or
  participation as a node in at least one artificial neural network.

14. A master device having a first set of computing resources including at least one computer processor,
  wherein the master device is connected to a wireless network having a decentralized infrastructure for inter-device communication, wherein at least a portion of the wireless network operates in a frequency band of approximately 2.400 GHz to approximately 2.500 GHz, and
  wherein the at least one computer processor is configured to at least:
  transmit a first query for computing functions tasked to each of the plurality of computer devices over the wireless network;
  receive, in response to the first query, information regarding a first computing function tasked to a first one of the computer devices over the wireless network;
  automatically determine a first minimum set of computing resources required to perform the first computing function;
  automatically determine that a set of computing resources for a second one of the computing devices meets or exceeds the first minimum set of computing resources required to perform the first computing function; and
  in response to automatically determining that the set of computing resources for the second one of the computing devices meets or exceeds the first minimum set of computing resources, automatically allocate the first computing function to the second one of the computer devices, wherein the first minimum set of computing resources required to perform the first computing function comprises at least one of:

a minimum processor cache, a minimum processor clock speed, a minimum amount of random access memory, a minimum amount of available database storage or a minimum transmission rate on the wireless network.

15. The master device of claim 14, wherein the at least one computer processor is further configured to at least:

in response to automatically determining that the set of computing resources for the second one of the computing devices meets or exceeds the first minimum set of computing resources, transmit an instruction to perform the first computing function to the second one of the computing devices over the wireless network.

16. The master device of claim 14, wherein the at least one computer processor is further configured to at least:

determine that the second one of the computing devices performed the first computing function;

transmit information regarding the performance of the first computing function to the first one of the computing devices over the wireless network, wherein the information regarding the performance of the first computing function indicates that the first computing function was performed on the second computer device.

17. The master device of claim 14, wherein the at least one computer processor is further configured to at least:

receive, in response to the first query, information regarding a second computing function tasked to the second one of the computer devices over the wireless network;

automatically determine a second minimum set of computing resources required to perform the second computing function;

automatically determine that a set of computing resources for the first one of the computing devices meets or exceeds the second minimum set of computing resources required to perform the second computing function; and automatically allocate the second computing function to the first one of the computer devices.

18. The master device of claim 14, wherein the first computing function comprises at least one of:

performance of a media processing application;

execution of an applied mathematics function; or participation as a node in at least one artificial neural network.

* * * * *